Patented Dec. 16, 1947

2,432,839

UNITED STATES PATENT OFFICE 2,432,839

CORROSION INHIBITORS—NITRITE SALTS OF PRIMARY AMINES

Aaron Wachter and Nathan Stillman, Berkeley, Calif., assignors to Shell Development Company, San Francisco, Calif., a corporation of Delaware No Drawing. Application October 7, 1946, Serial No. 701,619

7 Claims. (Cl. 252—392)

The present invention relates to water corrosion prevention inhibitors. More specifically it relates to corrosion inhibitors particularly suitable for use in preventing corrosion of certain metal surfaces by water associated in relatively small quantities with organic materials.

In the handling of various organic materials, particularly hydrocarbons and similar organic liquid compositions, it is often necessary to transport and/or store such materials in metal containers, as in steel or other metal pipelines, drums, tanks and the like. Since these materials often contain varying amounts of water in solution or in suspension which may separate, due to temperature changes, for example, internal corrosion of the container by separated water almost invariably occurs to a greater or lesser degree. This problem is especially serious when gasoline is under consideration. In spite of all reasonable and practicable precautions during the manufacture of gasoline, when the same is transported in pipelines or stored in drums or tanks for a period of time, especially as is so often practiced in handling aviation gasoline, an appreciable quantity of water separates and is found as a film or in minute droplets on the pipeline or container walls or even in small pools in the bottom of the container. This brings about ideal conditions for corrosion and consequent damage to the metal surfaces of the container as well as the even more serious contamination of the gasoline or other material contained therein by the corrosion products.

As a result of the above-described corrosion it has become necessary for manufacturers and shippers of such products to apply various internal coatings to the container walls or to add corrosion inhibitors of one type or another to the product being stored or shipped. It has long been recognized, however, that one of the great difficulties in inhibiting this type of corrosion lies in the fact that those inhibitors which are soluble in organic materials are relatvely ineffective in preventing water corrosion of metal surfaces. On the other hand, those inhibitors which are efficient in preventing this type of corrosion are but slightly, if at all, soluble in organic materials and their application is thus rendered quite difficult for these purposes.

For example, various water-soluble corrosion inhibitors may be utilized for preventing corrosion of gasoline storage tanks by water collecting in the bottom of the tank, a suitable and sufficient quantity of the desired inhibitor being injected in the bottom of the tank to inhibit both water already separated or intentionally maintained therein and water which may later separate from the gasoline and collect in the bottom of the tank. However, part of the water which separates collects on the tank wall, corroding and damaging the same, the corrosion products in turn contaminating the gasoline.

Analogous corrosion problems occur in numerous other fields; for example in the lubrication of internal combustion engines, steam engines including turbines, and other similar machinery, quantities of water are often observed as a separate phase within the lubricating system as a result of condensation of water from the atmosphere, or, in the case of combustion engines, as a result of dispersion or absorption in the lubricating oil of water formed as a product of fuel combustion. Water in such instances corrodes the various metal parts of the machinery with which it comes in contact, the corrosion products causing further mechanical damage to bearing surfaces and the like due to their abrasive nature and catalytically promoting the chemical degradation of the lubricant. In this instance, as in the example cited above, the inhibitors known to the art have not always been entirely satisfactory, the organic material-soluble inhibitors being, in general, relatively ineffective water-corrosion inhibitors, and the water-soluble inhibitors being difficult and in most instances impracticable in their application. The same or similar problems arise in the preparation and use of various coating compositions such as greases, waxes, household oils, paints, lacquers, water-soluble paints, etc., which are often applied to metal surfaces for protective or other purposes.

It is an object of the present invention to provide potent corrosion inhibitors which are soluble in both organic materials and water. A further object is to provide inhibitors of this type which satisfactorily prevent corrosion of certain metal surfaces by water. Further objects are to provide water-corrosion inhibitors which are stable at ordinary temperatures of use, easily and inexpensively prepared and will not deleteriously affect organic materials with which they are incorporated. Other objects, together with some of the advantages to be derived in utilizing the inhibitors of the present invention, will become apparent from the following detailed description thereof.

It has been found, according to the present invention, that certain nitrite salts of organic primary amines are excellent water-corrosion inhibitors and are soluble both in water and organic materials. The primary amines preferably used in preparing the present inhibitors include those which have basic dissociation constants at least approximately as high as the acidic dissociation constant of nitrous acid; i. e., with nitrous acid having a dissociation constant $K_a = 4 \times 10^{-4}$ at 18° C., the primary amines used in preparing the nitrite salt should have dissociation constants at least approximately $K_b = 4 \times 10^{-4}$ at 18° C. in order to prepare salts which are stable at temperatures of the order of 20° C. or more. If the composition containing the inhibitor is to be exposed to relatively high temperatures, such as may be encountered in inhibited lubricating oil for engines (160° C. to 180° C. for internal combustion engines, 75° C. to 90° C. for turbine oils, etc.), a primary amine having a dissociation constant sufficiently high and a suitable molecular structure to form a nitrite salt stable at these temperatures must, of course, be selected.

Primary amines which are not suitable are those which are very easily oxidized or otherwise destroyed, either upon use or in contact with nitrous acid. For example, nitrous acid reacts with many aliphatic primary amines to yield nitrogen, and alcohol and other products, rather than the nitrite salts.

Primary amines which are specifically suited to yield relatively stable salts of nitrous acid are members of the following sub-classes:

(1) Methyl amine.

(2) Primary amines in which the amine radical is attached to a secondary carbon atom, as in the following structures:

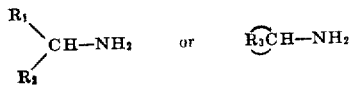

wherein $R_1$ and $R_2$ are hydrocarbon radicals which may be aliphatic, alicyclic, heterocyclic, or aromatic, and may, if desired, contain preferably not more than one olefinic double bond. $R_1$ and $R_2$ may join to form a divalent ring radical $R_3$. Specific examples are 2-amino-4-methyl-pentane and 3,3,5-trimethyl cyclohexylamine.

(3) Primary amines of the formula:

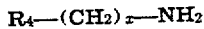

wherein $R_4$ is an aromatic hydrocarbon radical, preferably a phenyl or alkylated phenyl radical; and $x$ is an integer of 1 up to about 20, preferably 1 or 2.

Specific examples of suitable primary amines are: methylamine, 2-amino-3-methyl-butane, isopropylamine, isobutylamine, various hexyl, heptyl, octyl, nonyl, decyl amines; paraffin wax amines prepared by chlorination of paraffin wax and ammonolysis of the product; cyclohexylamine, C-methyl cyclohexylamine, trimethyl cyclohexylamine, benzylamine, betaphenylethylamine, tetrahydro betanaphthylamine, allylamine, etc.

In selecting one of the above primary amines for making the corresponding salt, consideration should be given to the fact that when a salt which is relatively highly soluble in water-immiscible organic materials is desired, a primary amine having a sufficient number of carbon atoms to impart to the salt the necessary solubility should be chosen. As a rule, for these purposes it is desirable that the primary amine have at least 5 carbon atoms. For use with organic materials which are water-miscible to an appreciable extent, primary amines having less than 5 carbon atoms may be utilized and in some instances may be found preferable.

The several hydrocarbon radicals may contain stable and inert polar substitution radicals, though preferably not more than one each. Too many polar radicals tend in general to reduce the solubilities of the salts in various organic substances, particularly in hydrocarbon oils and the like. Suitable polar radicals include chlorine, ether, sulfide, alcohol, amine, etc., radicals.

Nitrous acid salts of primary amines are suitable for use in preventing corrosion of metal surfaces by water associated in small quantities with hydrocarbons such as liquid propane, butane, n-pentane, iso-pentane, hexanes, iso-octanes, benzene, toluene, xylenes; various gasolines, e. g. natural gasoline, straight-run gasoline, cracked gasolines (catalytically or thermally cracked, reformed, isomerized, etc.), Diesel fuels, range fuels, bunker fuels, lubricating oils, greases, petrolatum, paraffin wax, vegetable waxes, resins, asphalts, paints, lacquers, enamels, etc.

The inhibitors of the present invention may be prepared, in most instances, by stoichiometric reaction of a primary amine with nitrous acid.

In certain instances the inhibitors may be prepared in situ, as for example an oil which inhibited water-corrosion of metal surfaces was prepared by passing nitrous acid gas through an oil containing primary amines in solution, thus forming water and oil-soluble primary amine nitrite salts. Other methods which have been found more generally suitable for preparing nitrite salts of primary amines include the following:

*Method I.*—The hydrochloride of the primary amine is contacted with sodium nitrite in a solution in which the corresponding primary amine inhibitor nitrite salt is insoluble, the reaction yielding, by double decomposition, the inhibitor salt as a precipitate and leaving an inorganic chloride in solution.

*Method II.*—An acetone solution of the suitable primary amine is prepared and dry hydrogen chloride gas passed therethrough. A reaction results from which is obtained the corresponding primary amine hydrochloride, which is usually relatively insoluble in cold acetone and precipitates. Silver nitrite, freshly prepared from silver nitrate and sodium nitrite and dried with acetone, is then mixed with the primary amine hydrochloride in the acetone. A second reaction thereupon occurs, yielding an acetone solution of the primary amine nitrite salt and silver chloride precipitate. Although in this instance both reactants are but slightly soluble in acetone, by virtue of the extremely low solubility of the silver chloride in acetone, the reaction usually proceeds to completion at room temperature within a period of approximately one hour. The silver chloride is filtered from the acetone and the acetone filtrate evaporated to obtain the desired primary amine nitrite, which may be further purified by recrystallization from a suitable solvent.

*Method III.*—A preferred method for preparing primary amine nitrite salts for the purposes of the present invention comprises slowly adding concentrated sulfuric acid to an approximately 50% by volume aqueous solution of acetone in the presence of the primary amine and an excess of sodium nitrite. After the reaction has occurred, the mixture is diluted to about 10 times its original volume with acetone, resulting in a solution of the primary amine nitrite salt and a precipitate of insoluble salts such as sodium sulfate and sodium nitrite. After filtration of the insoluble salts the acetone solution is evaporated to recover the organic nitrite salt, which may be further purified by recrystallization from a suitable solvent.

By using one of the above procedures, a nitrite salt of the primary amines previously mentioned can be prepared, provided that at the end of the reaction the solution of primary amine nitrite salt or an aqueous extract thereof has a pH of at least approximately 7, as the primary amine nitrite salts tend to decompose in acidic solution.

The compounds listed in the following table were prepared by method III above.

| Compound | $NO_2$ Content—in wt. per cent | |
|---|---|---|
| | Calculated | Analysis |
| 3,3,5-trimethylcyclohexylamine nitrite | 24.4 | 20.1 |
| Beta-phenylethylamine nitrite | 32.0 | 32.8 |
| Mono-cyclohexylamine nitrite | 31.6 | 32.5 |

Method III is generally preferred in preparing the compounds of the present invention in view of the superior yields which are usually obtained. For example, in preparing the compounds listed above by this method, yields in excess of 90% by weight were obtained in the case of 3,3,5-trimethylcyclohexylamine nitrite.

The presently described inhibitors are most effective in preventing water-corrosion of ferrous metals, particularly steels, and of aluminum, nickel, and alloys of these metals.

The inhibitors of the present invention may be incorporated in any substantially neutral or alkaline organic material, whether solid, semi-solid or liquid, in which they are soluble and with which they do not chemically react. Thus, they may be added to hydrocarbons (which may be paraffinic, olefinic, naphthenic or aromatic) of the type described; or to chlorinated hydrocarbons, alcohols, ethers, esters, ketones, nitriles, amino compounds, amides, non-edible fats and fatty oils, paints, varnishes, natural waxes, oils, etc., which in the presence of $H_2O$ do not render the water acidic.

When adding the inhibitors to light hydrocarbon oils such as gasoline, benzene, kerosene, etc., .005% by weight of the nitrite salt will generally be found satisfactory for inhibition of water-corrosion of metals. The precise amount of inhibitor to be utilized in each instance will, of course, vary with the particular conditions at hand and should be determined experimentally, particularly when unusually severe corrosion conditions are to be overcome. However, in the majority of practical applications when handling substantially water-insoluble organic materials of this type, the addition of approximately .0001% to .3% by weight of inhibitor will be found satisfactory.

Larger amounts of inhibitor may be required for inhibiting other organic materials, particularly those miscible with water, such as alcohols, ketones, and the like, as for example methyl alcohol, ethyl alcohol, propyl alcohol, acetone, methyl ethyl ketone, methyl vinyl ketone, dioxane, etc. In such instances quantities of inhibitor amounting to approximately .01% to .5% by weight of the water content of the organic material are preferably utilized.

Among other suitable applications for the present inhibitors the following come into consideration. For slushing oils and other rust-preventive coatings, nitrous acid salts of primary amines will be found effective as corrosion inhibitors, for most practical applications, when incorporated in the coatings in amounts ranging approximately as follows: oil base coatings, 0.05% to 1.0% by weight; wax base coatings, other than petroleum wax (petrolatum) base coatings, 0.05% to 1.0% by weight; petroleum wax base coatings, 0.05% to 5.0% based on the petroleum wax content of the particular coating; primer coatings for paint, 0.02% to 0.3% by weight based on the dry constituents; lubricant compositions, such as lubricating oils for internal combustion engines, turbines and the like, greases, semi-greases, etc., 0.005% to 0.2% by weight; general purpose oils, such as household oils, 0.05% to 1.0%.

The optimum quantity of the present inhibitors to be used will, of course, vary with the particular conditions under which they are used and the specific inhibitor compound utilized.

In those applications wherein water having acidic characteristics is encountered, a small quantity of an alkalizing agent should be added, when primary amine nitrite salts are used. It has been found that these inhibitors are relatively ineffectual for inhibiting corrosion of metal surfaces by water having a pH less than 6. This is another reason why the composition containing the inhibitor should be alkaline. The desired pH may be maintained, when necessary, by adding a sufficient quantity of a water-soluble alkaline compound, such as sodium hydroxide, to the water to increase the pH to at least 6, or by adding a sufficient quantity of a suitable nitrogen base, such as 3,3,5-trimethyl-cyclohexyl amine to the organic material in which the inhibitor is incorporated. Best results are obtained when the pH of the water is held to a value of at least approximately 8, no additional advantage being obtained above a pH of 12.

In all instances the action of the inhibitors described above appears to be the same. Being soluble in both water and organic materials, they may be easily incorporated in most organic materials. When the material to which the inhibitors have been added is brought into contact with free water, either by means of externally introduced moisture or by separation of water from the organic material, the water takes up inhibitor from the organic material and is rendered innocuous with regard to the metal surfaces noted above. Thus, for example, in the specific instance wherein one of the inhibitors of the present invention is added to gasoline which is to be stored in a tank or similar vessel, water separating from the gasoline and either falling to the bottom of the tank or adhering to the walls of the tank takes up inhibitor from the gasoline with which it is in contact and becomes inhibited.

The following specific example serves to illustrate the effectiveness of the presently disclosed corrosion inhibitors:

*Example*

One inch square low carbon steel specimens were placed in glass receptacles containing 20 cc. of benzene to which had been added varying amounts of 3,3,5-trimethylcyclohexylamine nitrite as the inhibitor. A corrosive consisting of either 0.05 cc. of an aqueous solution containing 0.05% by weight of sodium chloride or the same amount of water was then sprayed through the benzene in each receptacle and on to the steel specimen. Visual examination of the steel specimens was made after standing under the above conditions at room temperature for a period of seven days. The following results were obtained:

| Exp. | Conc. of inhibitor in benzene | Corrosive | Appearance of specimen after 7 days |
|---|---|---|---|
| | *Per cent by wt.* | | |
| 1 | None | NaCl in water | Heavy rust formations. |
| 2 | None | Water | Do. |
| 3 | 0.05 | NaCl in water | No rust. |
| 4 | 0.005 | do | Do. |
| 5 | 0.001 | do | Very light rust spots. |
| 6 | 0.005 | Water | No rust. |
| 7 | 0.001 | do | Do. |

The stability of a representative primary amine nitrite inhibitor in water at elevated temperatures is indicated by the following experiment in which an aqueous solution containing 0.01 gram of inhibitor in 100 cc. of water was refluxed at 100° C. for a period of 6 hours.

| Inhibitor | $NO_2$ Content, wt. per cent | | |
|---|---|---|---|
| | Theoretical | Analysis | Analysis After Refluxing |
| 3,3,5-trimethylcyclohexylamine nitrite | 24.4 | 20.1 | 19.7 |

The results obtained above clearly demonstrate that little, if any, decomposition of the inhibitor takes place in aqueous solutions even at temperatures considerably above those encountered in most corrosion inhibition problems.

The present application is a continuation-in-part of the copending application, Serial No. 492,640, filed June 28, 1943, now Patent No. 2,419,327.

We claim as our invention:

1. A non-corrosive composition of matter comprising a major proportion of an organic material having a pH of at least approximately 7 and coming in contact with water during the useful life thereof, said organic material having dissolved therein in minor proportion, but in amount sufficient to inhibit corrosion of metal surfaces by said water, 3,3,5-trimethyl-cyclohexylamine nitrite, said nitrite being normally non-reactive with said organic material.

2. A non-corrosive composition of matter comprising a major proportion of an organic material having a pH of at least approximately 7 and coming in contact with water during the useful life thereof, said organic material having dissolved therein in minor proportion, but in amount sufficient to inhibit corrosion of metal surfaces by said water, mono-cyclohexylamine nitrite, said nitrite being normally non-reactive with said organic material.

3. A non-corrosive composition of matter comprising a major proportion of an organic material having a pH of at least approximately 7 and coming in contact with water during the useful life thereof, said organic material having dissolved therein in minor proportion, but in amount sufficient to inhibit corrosion of metal surfaces by said water, beta-phenylethylamine nitrite, said nitrite being normally non-reactive with said organic material.

4. A non-corrosive composition of matter comprising a major proportion of an organic material having a pH of at least approximately 7 and coming in contact with water during the useful life thereof, said organic material having dissolved therein in minor proportion, but in amount sufficient to inhibit corrosion of metal surfaces by said water, a nitrite salt of a primary amine in which the amine radical is attached to a secondary carbon atom, said primary amine nitrite salt being substantially stable at atmospheric temperature, soluble in water and in said organic material and normally non-reactive with said organic material.

5. A non-corrosive composition of matter comprising a major proportion of an organic material having a pH of at least approximately 7 and coming in contact with water during the useful life thereof, said organic material having dissolved therein in minor proportion, but in amount sufficient to inhibit corrosion of metal surfaces by said water, a nitrite salt of a primary amine, said primary amine nitrite salt being stable at atmospheric temperature, soluble in water and in said organic material and normally non-reactive with said organic liquid.

6. A non-corrosive composition of matter comprising a major proportion of a water-insoluble organic liquid having a pH of at least approximately 7 and coming in contact with water during the useful life thereof, said organic liquid having dissolved therein in minor proportion, but in amount sufficient to inhibit corrosion of metal surfaces by said water, a nitrite salt of a primary amine, said primary amine nitrite salt being stable at atmospheric temperature, soluble in water and in said organic liquid and normally non-reactive with said organic liquid.

7. A non-corrosive composition of matter comprising a major proportion of a liquid hydrocarbon having a pH of at least approximately 7 and coming in contact with water during the useful life thereof, said liquid hydrocarbon having dissolved therein in minor proportion, but in amount sufficient to inhibit corrosion of metal surfaces by said water, a nitrite salt of a primary amine, said primary amine nitrite salt being stable at atmospheric temperature, soluble in water and in said liquid hydrocarbon and normally non-reactive with said liquid hydrocarbon.

AARON WACHTER.
NATHAN STILLMAN.

REFERENCES CITED

The following references are of record in the file of this patent:

UNITED STATES PATENTS

| Number | Name | Date |
|---|---|---|
| 2,321,517 | Rosen | June 8, 1943 |
| 2,333,206 | Sloan | Nov. 2, 1943 |

OTHER REFERENCES

Hackh's Chemical Dictionary, 3d ed. (1944), page 43, column 2.

Williams, Introd. to Org. Chem., 2d ed., D Van Nostrand Co., Inc. (1931), page 180.